United States Patent
Piai et al.

(10) Patent No.: US 10,288,059 B2
(45) Date of Patent: May 14, 2019

(54) BEVERAGE PRODUCTION MODULE AND METHOD FOR OPERATING A BEVERAGE PRODUCTION MODULE WITH REDUCED VOLTAGE

(71) Applicant: NESTEC S.A., Vevey (CH)

(72) Inventors: Guido Piai, Munich (DE); Stefan Etter, Kehrsatz (CH)

(73) Assignee: Nestec S.A., Vevey (CH)

( * ) Notice: Subject to any disclaimer, the term of this patent is extended or adjusted under 35 U.S.C. 154(b) by 648 days.

(21) Appl. No.: 14/568,853

(22) Filed: Dec. 12, 2014

(65) Prior Publication Data
US 2015/0098836 A1 Apr. 9, 2015

Related U.S. Application Data

(63) Continuation of application No. 12/673,059, filed as application No. PCT/EP2008/060555 on Aug. 12, 2008, now Pat. No. 8,951,020.

(30) Foreign Application Priority Data

Aug. 20, 2007 (EP) .................................... 07114608

(51) Int. Cl.
*F04B 49/06* (2006.01)
*F04B 23/02* (2006.01)
(Continued)

(52) U.S. Cl.
CPC .............. *F04B 49/06* (2013.01); *F04B 17/03* (2013.01); *F04B 23/02* (2013.01); *F04B 49/065* (2013.01);
(Continued)

(58) Field of Classification Search
CPC ........ F04B 49/06; F04B 49/065; F04B 23/02; F04B 41/02; F04B 35/04; F04B 17/03; F04B 2203/0202; F04B 2203/0402
See application file for complete search history.

(56) References Cited

U.S. PATENT DOCUMENTS

| 3,461,806 A | 8/1969 | Barthlon |
| 3,537,384 A | 11/1970 | Stauber |

(Continued)

FOREIGN PATENT DOCUMENTS

| DE | 4420629 | 12/1995 |
| DE | 202006014317 | 2/2008 |

(Continued)

OTHER PUBLICATIONS

Application No. EP08787125.7, Notice of Opposition dated Apr. 4, 2014.

(Continued)

*Primary Examiner* — Bryan M Lettman
(74) *Attorney, Agent, or Firm* — K&L Gates LLP (57) ABSTRACT

A beverage production module includes a pump for delivering a fluid from a tank to an extraction chamber, a power source for the pump, and a controller for operating the pump and for controlling the voltage applied from the power source to the pump. The controller is adapted to operate the pump at a normal operation voltage (U3) and to operate the pump over a predefined time (T1,T2) at a reduced voltage level (U1, U2).

12 Claims, 7 Drawing Sheets

(51) Int. Cl.
*F04B 17/03* (2006.01)
*A47J 31/36* (2006.01)
*A47J 31/46* (2006.01)

(52) U.S. Cl.
CPC ............... *A47J 31/36* (2013.01); *A47J 31/46* (2013.01); *F04B 2203/0202* (2013.01); *F04B 2203/0402* (2013.01)

(56) References Cited

U.S. PATENT DOCUMENTS

| | | | |
|---|---|---|---|
| 4,242,568 | A | 12/1980 | Wunderlin et al. |
| 4,313,075 | A | 1/1982 | Stewart et al. |
| 5,186,096 | A | 2/1993 | Willi |
| 5,738,001 | A | 4/1998 | Liverrani |
| 6,293,099 | B1 * | 9/2001 | Kamiya .................. B66F 9/22 60/421 |
| 7,021,725 | B2 * | 4/2006 | Kokubo ................. B60T 8/405 303/11 |
| 7,028,603 | B1 | 4/2006 | Gremillion et al. |
| 7,856,920 | B2 | 12/2010 | Schmed et al. |
| 8,418,601 | B2 | 4/2013 | Magg et al. |
| 2004/0062059 | A1 * | 4/2004 | Cheng ................ B60L 11/1814 363/17 |
| 2005/0011364 | A1 * | 1/2005 | Chen ..................... A47J 31/46 99/275 |
| 2005/0076788 | A1 | 4/2005 | Grant et al. |

FOREIGN PATENT DOCUMENTS

| | | |
|---|---|---|
| EP | 0387477 | 9/1990 |
| EP | 1210893 | 6/2002 |
| FR | 2847708 | 5/2004 |
| GB | 2253388 | 9/1992 |
| JP | 2001188960 | 7/2001 |
| WO | 02087399 | 11/2002 |
| WO | 2005074698 | 8/2005 |
| WO | 2006050856 | 5/2006 |
| WO | 2006070257 | 7/2006 |
| WO | 2006136329 | 12/2006 |
| WO | 2007060694 | 5/2007 |
| WO | 2007110768 | 10/2007 |

OTHER PUBLICATIONS

"Thema: Pumpe zwecks Preinfusion abschalten—Seite 2", http://www.kaffee-netz.de/espresso-und-kaffeemaschinen/11233-pumpezwecks-preinfusion-abschalten-2.html, Kaffee-Netz Community—Apr. 3, 2014, pp. 1-9 (D32 in EP Opposition Proceedings).

"Preinfusion Verschiedene Methoden", http://www.kaffee-netz.de/grunds-tzliches/11876-preinfusion-verschiedene-methoden.html]Kaffee-Netz Community—Apr. 3, 2014, pp. 1-7 (D31 in EP Opposition Proceedings).

My Cup Melitta, Futura Salzburg, 2004, Melitta GmbH, www.mycup.com, Haushaltstechnik and Telekommunikation Futura 2004, 4 pages (D34 in EP Opposition Proceedings).

"Besser als Senseo", test Dec. 2006, Portionskaffeemaschinen, Haushalt + Garten, pp. 70-74 (D35 in EP Opposition Proceedings).

Eugster/Frismag—EF.354, 2014, 4 pages (D36 in EP Opposition Proceedings).

Datenblatt Invensys mit Zeichnung der Pompe CP3L, 1 page (D37 in EP Opposition Proceedings).

Melitta MyCup 140331 Pumpensteuerung, Versuchsbericht, Measurements Setup, Apr. 3, 2014 (D38 in EP Opposition Proceedings).

* cited by examiner

BEVERAGE PRODUCTION MODULE AND METHOD FOR OPERATING A BEVERAGE PRODUCTION MODULE WITH REDUCED VOLTAGE

PRIORITY CLAIM

This application is a continuation of U.S. application Ser. No. 12/673,059, filed May 25, 2011, which is a U.S. national stage filing of International App. PCT/EP2008/060555, filed on Aug. 12, 2008, which claims priority to European Patent Application No. 07114608.8, filed Aug. 20, 2007, the entire contents of which are being incorporated herein by reference.

FIELD OF THE INVENTION

The present invention generally relates to the production of beverages or liquid comestibles (soup, etc.). Preferably, the invention relates to production devices which are designed to produce a beverage on the basis of ingredients which are contained in a capsule. The capsule is inserted in the beverage production module which is provided with means to introduce a liquid into the interior of the capsule. The interaction of the introduced liquid with the ingredients produces a beverage which can then be obtained from the beverage production module.

BACKGROUND

As an illustrated example, such devices are already used, among others, in the field of coffee machines. Especially regarding coffee machines there is a wide range between relatively simple "one button" machines on one end of the range, and highly complex machines with integrated additional functions, such as for example producing steam, prewarming cups and/or ensuring a "flow stop" function, etc., at the higher end of the range.

Highly important tasks within the field of beverage production modules are user friendliness and quality of the produced beverage.

SUMMARY

It is the object of the present invention to propose a beverage production module and a method for operating a beverage production module which is user friendly and insures a good quality of the produced beverage.

According to a first aspect the present invention relates to a beverage production module comprising a pump for delivering a fluid from a tank to a extraction chamber, a power source for the pump and a controller for operating the pump and for controlling the voltage applied from the power source to the pump, wherein the controller is adapted to operate the pump at a normal operation voltage level and to operate the pump over a predefined time at a reduced voltage level.

According to one embodiment, the controller is adapted to operate the pump after the start at said reduced voltage level and after the predefined time to operate the pump at said normal operation voltage level.

According to a further embodiment, the controller is adapted to operate the pump at said normal operation voltage and during the operation to operate the pump for the predefined time at said reduced voltage level.

In one aspect the reduced voltage level is a constant voltage.

In another aspect the reduced voltage level is a decreasing or increasing voltage.

Preferably, the power source provides DC voltage to the pump.

The pump circuit can comprise a Buck-converter.

The pump circuit can alternatively comprise a motor chopper.

As an alternative to the provision of direct current, the power source can provide alternating current AC voltage to the pump.

Preferably, the controller is adapted to operate the pump at a reduced voltage level by decreasing the root mean square (RMS) value of the applied voltage (and thus reducing the power).

Alternatively, the controller is adapted to operate the pump at a reduced voltage level by decreasing the maximum applied voltage level.

The pump can be an inductive load.

According to a further aspect of the present invention a method is provided for operating the pump of a beverage production module, comprising the steps of providing a power source for the pump, delivering via the pump a fluid from a tank to an extraction chamber and during said step of delivering operating the pump at a normal operation voltage level and operating the pump over a predefined time at a reduced voltage level.

In a first embodiment the method comprises operating the pump after the start at said reduced voltage level and operating after the predefined time the pump at said normal operation voltage.

In a second embodiment the method comprises operating the pump at said normal operation voltage and during the operation operating the pump for the predefined time at said reduced voltage level.

Preferably, the method comprises providing for the reduced voltage level a constant voltage.

Alternatively, the method comprises providing for the reduced voltage level a decreasing or increasing voltage.

Preferably, the method comprises providing direct current DC voltage to the pump.

The method can comprises providing a Buck-converter for the pump circuit.

Alternatively, the method can comprise providing a motor chopper for the pump circuit.

As an alternative to providing direct current the method can comprise providing alternating current AC voltage to the pump.

Preferably, the method comprises operating the pump at a reduced voltage level comprises decreasing the root mean square (RMS) value of the applied voltage.

Alternatively, the method comprises operating the pump at a reduced voltage level comprises decreasing the peak value of the voltage.

According to another aspect the present invention relates to a beverage production module comprising a pump for delivering a fluid from a tank to an extraction chamber, a power source for the pump and a controller for operating the pump and for controlling the voltage applied from the power source to the pump, wherein the controller is adapted to start the operation of the pump at a reduced voltage level and after a predefined time to operate the pump at a normal operation voltage.

Preferably, the controller is adapted to operate the pump at said reduced voltage level for less than 10 s.

According to another aspect the present invention relates to a method for operating the pump of a beverage production module, comprising the steps of providing a power source for the pump, delivering via the pump a fluid from a tank to a extraction chamber and at the beginning of said step of delivering operating the pump at a reduced voltage level and after a predefined time operating the pump at a normal operation voltage.

Preferably, the predefined time is less than 10 s.

Further features, advantages and objects of the present invention will become evident by means of the figures of the enclosed drawings as well as by the following detailed explanation of illustrative-only embodiments of the present invention.

DETAILED DESCRIPTION

Figure 1:
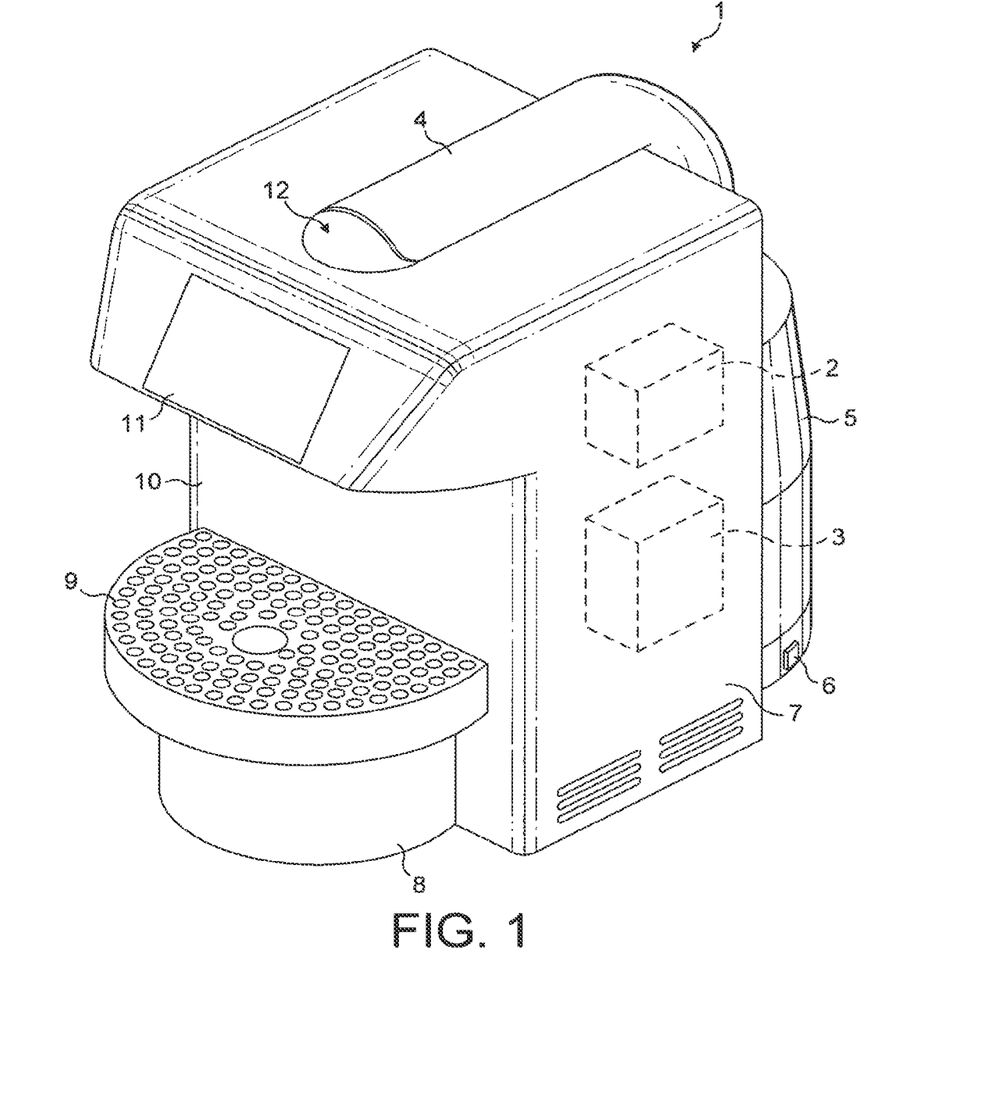
FIG. 1 shows a beverage production module according to the present invention.

FIG. 1 shows a beverage production module according to the present invention, generally designated with reference numeral 1, which comprises a casing 7 which houses further components or to which further components are attached.

The beverage production module 1 comprises a beverage delivery outlet via which a beverage produced by the beverage production module 1 and delivered to the beverage delivery outlet by a pump 3 can be obtained. On the rear side of the casing 7 a water supply reservoir or water container 5 can be provided.

On the front side of the beverage production module 1 a base part can be provided. The base part can essentially have a shape of a half-cylindrical platform. The base part can comprise a drip tray 8 and the upper surface of the base part can serve as a cup support 9 in the region which is essentially arranged vertically below the beverage delivery outlet. The drip tray 8 can serve for collecting liquid dripping from the beverage delivery outlet.

The beverage production module can comprise further a catchment tank 10 for collecting capsules which have been used and which dropped internally after the beverage has been delivered.

The base part comprising the drip tray 8 and the cup support 9 can be removably attached to the casing 7. Alternatively, the entire component consisting of the drip tray 8, the cup support 9 and the catchment tank 10 can be attached revovably to the casing 7 in order to rinse or empty the drip tray 8 and to empty the catchment tank 10.

Inside the casing 7, the beverage production module 1 can comprise a water pump 3, a water heating unit 2 such as for example a thermo block or a boiler as well as an extraction chamber 13. The pump 3 is adapted to pump water or any other fluid contained in the tank 5 to the extraction chamber 13 where the beverage then is prepared. The water which is pumped from the tank 5 to the extraction chamber 13 is heated by the water heating unit 2. Thus, the beverage production module 1 is capable of producing a heated, preferably pressurised liquid and then to feed it into the extraction chamber 13 in order to prepare a beverage in a cup or glass.

The pump 3 and the heating unit 2 as well as further components housed in the casing 7 are not visible from the outside and are therefore shown with dashed lines in the figures.

The extraction chamber 13 can be designed to house a beverage ingredient containing pouch or capsule, which can be inserted through a capsule inserting slot 12 on the top surface of the casing 7 when lifting or opening a leaver or lid arranged on the top surface of the casing 7. The leaver or lid functions also as activator 4 for mechanically or automatically clamping the capsule and starting the preparation process. Heated water, preferably under pressure, will then be injected into the capsule in order to interact with the ingredients contained therein.

The beverage production module 1 can furthermore be provided with a graphical interface 11 such as for example a display, a touch pad or the like in order to allow the control of the operation of the beverage production module.

In addition, the beverage production module 1 can comprise further user interfaces, such as for example switches or buttons 6 and so on to further control the operation of the module 1.

Figure 2:
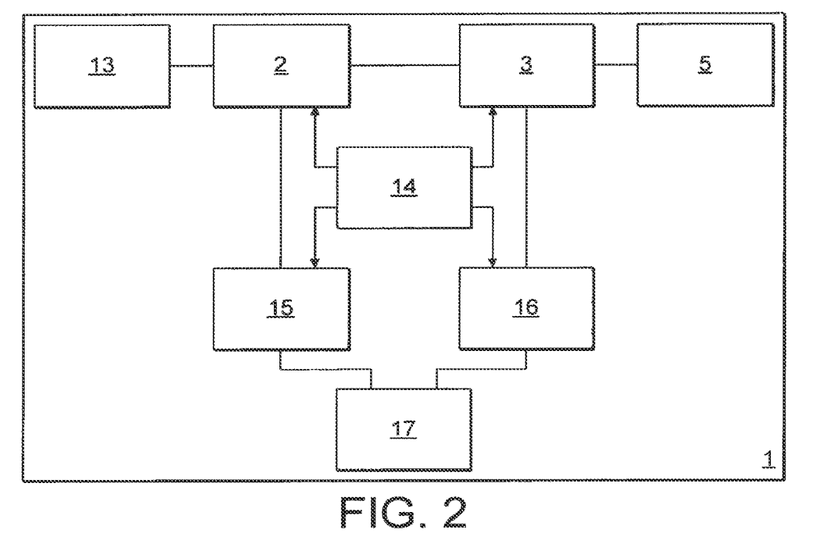
FIG. 2 shows a schematic block diagram of the main elements of a beverage production module according to the present invention.

With reference to FIG. 2 the main components of a beverage production module 1 according to the present invention will be explained in relation to the block diagram. It is to be noted that the beverage production module 1 comprises further elements and components necessary for carrying out the functionalities, which are not shown in the figure for the sake of clarity.

As already explained a beverage production module 1 comprises a tank 5 containing the liquid, fluid or water which is used for preparing the beverage. A pump 3 is adapted to deliver liquid from the tank 5 to the heating unit 2 and further to the extraction chamber 13, into which the capsule can be inserted. A power source 17 is provided which delivers power to the pump 3 and the heating unit 2. The power source 17 may be connected also to further components which in the block diagram is not shown for the sake of clarity. Alternatively, different power sources for the heating unit 2 and the pump 3 may be provided.

The power source 17 is connected to the pump 3 via a pump triac 16 and is further connected to the heating unit 2 via a heating triac 15. The heating triac 15 and the pump triac 16 are adapted to block parts of the voltage which are applied from the power source 17 to the pump 3 and the heating unit 2. For example, when an alternating current (AC) voltage is provided by the power source 17, then the heating triac 15 and the pump 16 will block the negative part of the voltage sinus, the triac thus acting as a rectifier.

In addition, a controller 14 is provided for controlling the different components of the beverage production module 1. Specifically, the controller 14 controls the operation of the pump 3, the heating unit 2, and the triacs 15 and 16.

Figure 3:
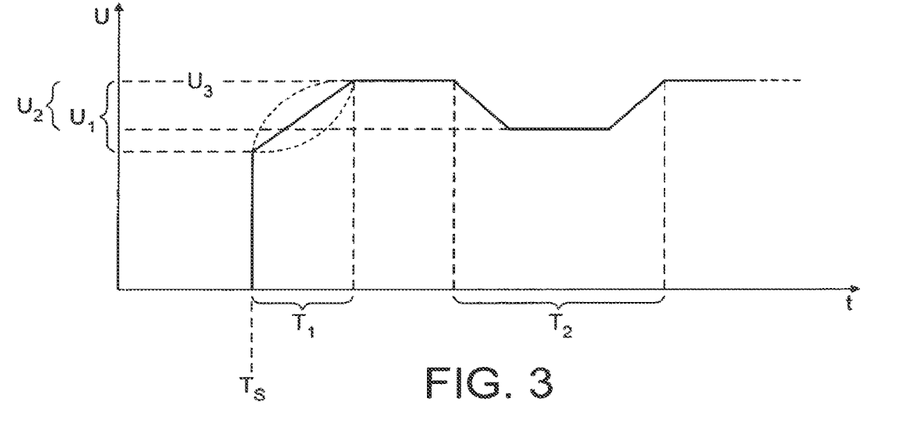
FIG. 3 is a diagram showing the development of the pump voltage over the time.

FIG. 3 shows a diagram of the pump voltage over the time. Hereby, a coordinate system is shown, whereby on the x-axis the time t is shown and on the y-axis the pump voltage, that is the voltage which is applied to the pump 3 is shown.

With reference to FIG. 3, the main idea underlying the present invention will now be explained. In the normal operation mode, the pump 3 is operated with a normal operation voltage $U_3$. This voltage may either be the supply voltage of the electricity network to which the beverage production module 1 is connected or may be any other voltage which is intended for operating the pump, that voltage may e.g. be obtained by transforming the supply voltage to the desired voltage for operating the pump. The controller 14 according to the present invention is adapted to control the pump triac 16 or other components in a way to operate the pump 3 at voltages which are smaller than the normal operation voltage $U_3$. Specifically, the pump 3 can be operated over a predefined time at a voltage which is smaller than the normal operation voltage $U_3$.

Hereby, two different scenarios are possible. As shown in FIG. 3 at a starting time Ts the pump 3 is started. This may e.g. be triggered by a user pressing a button when he desires to make a coffee or by switching on the beverage production module 1. When starting the operation of the pump 3 at the starting time Ts the controller may operate the pump 3 at a voltage $U_1$ which is smaller than the normal operation voltage $U_3$. Within a predefined time $T_1$ the voltage $U_1$ is then increased until the normal operation voltage $U_3$ is reached. Hereby, the present invention is not limited to the example as shown in FIG. 3. The increasing of the voltage from $U_1$ to $U_3$ may be linear, exponential, logarithmic or the like. Further, it is also possible to maintain the voltage $U_1$ over the whole time $T_1$ and then suddenly switch to the normal operation voltage $U_3$. The advantage of starting the operation of the pump 3 with a lower voltage than the normal operation voltage $U_3$ is a decreased noise of the pump 3. The pump 3 specifically in the first seconds after being started is louder since during this period the first amount of water is pumped into the capsule.

It is to be noted that the voltage $U_1$ may refer to a constant voltage, to an increasing voltage or to a voltage being partly constant and partly increasing. In any case $U_1$ has just to satisfy the condition $U_1<U_3$. In FIG. 3 the example is shown, that $U_1$ is a linearly increasing voltage. With dashed lines other types of increase are shown. The voltage $U_1$, i.e. a voltage being smaller than the normal operation voltage $U_3$ is kept for a time $T_1$ after the start of the pump 3.

Normally, the pump within the first five seconds after the start of a coffee is louder. According to the present invention within this period the noise reduction is achieved by dimming the pump. "To dim" means to reduce the intensity of something. This word is normally used in the lighting, connected with the reduction of the intensity of a light source. In the present case to dim is intended to mean to reduce the voltage applied to the pump.

According to a further aspect of the present invention during the operation of the pump, whereby the pump 3 is operated with the normal operation voltage $U_3$, the pump may be dimmed for a predefined time period. As shown in FIG. 3 the pump voltage may be decreased to a voltage level $U_2$ for a predefined time $T_2$. Hereby, the decreasing from $U_3$ to $U_2$ may be linear, exponential or even suddenly.

Again it is to be noted that the voltage $U_2$ may refer to a constant voltage, to a decreasing and/or increasing voltage or to a voltage being partly constant and partly decreasing and/or increasing. In any case $U_2$ has just to satisfy the condition $U_2<U_3$. In FIG. 3 the example is shown, that $U_2$ is a linearly decreasing, kept constant for a while and then increasing again.

The advantage of dimming the pump 3 during the normal operation is that thereby the flow and pressure of the pump 3 can be regulated. Specifically, when reducing the voltage also the amount of liquid which is delivered by the pump from the tank 5 to the extraction chamber 13 is reduced, e.g. the ratio of liquid per time is decreased. This is for example important for the quality of the coffee, the so called "in cup quality". Sometimes, the ingredients contained within the capsule are so solvent that the heating unit 2 is not able to heat all the liquid pumped by the pump 3 from the tank 5 to the extraction chamber 13. In this case, it is advantageous to reduce the amount of liquid per time delivered by the pump 3.

Another example is the so-called "crema" of the coffee. The crema is a sign for a high quality coffee and depends on the pressure applied when delivering the liquid into the capsule within the extraction chamber 13. By controlling the voltage applied to the pump 3 also the pressure of the pump 3 can be controlled and thereby the creation of the crema can be controlled and enhanced.

Further, $U_1$ and $U_2$ may be equal or different voltage ranges, whereby the present invention is not limited to the example shown in FIG. 3, where the voltage range of $U_1$ is larger than the voltage range of $U_2$.

It is to be noted that the normal operation voltage of the pump 3 may be reduced just once, i.e. either at the beginning of the operation of the pump 3 or in-between the operation of the pump 3. A further possibility would also be to reduce the voltage a t the end of the pump operation.

Figure 4A:
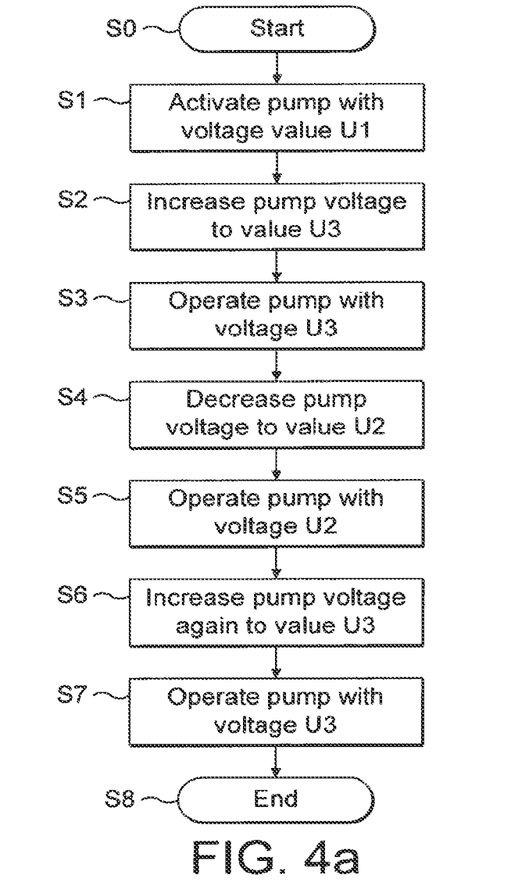
FIG. 4A is a flow chart showing the process steps according to the main idea underlying the present invention.

FIG. 4A shows a flow chart showing the process steps according to the main idea of the present invention. The process starts in step S0 e.g. with switching on the beverage production module 1 or with starting the preparation of a coffee. The pump 3 is then activated with a voltage value $U_1$. In the next step S2 the pump voltage is increased to the normal pump operation voltage $U_3$. As previously explained different methods of operating the pump with the lower voltage or increasing the voltage are possible. The pump then in step S3 is operated with the normal voltage $U_3$. In the next step $S_4$ the pump voltage can be decreased to a value $U_2$ being smaller than the normal operation voltage $U_3$. In the further step the pump can be operated for a predefined time with the voltage $U_2$.

In the next step S6 the pump voltage is increased again to the normal operation value U3 and the pump in step S7 is operated with the normal voltage value $U_3$. The process ends in step S8 for example with the delivery of the beverage from the beverage production module 1 or with switching off the beverage production module 1. It is to be noted that the step $S_1$ can be omitted and that the process can from the beginning start with a normal operation voltage value of $U_3$. Alternatively, the steps $S_4$ to $S6$ can be omitted and the pump voltage can be reduced only during the start sequence. A further possibility is to reduce the voltage additionally or exclusively at the end of the operation of the pump 3.

In the following different embodiments for reducing the pump voltage will be explained with reference to the figures.

FIGS. 4B, 4C, 5A and 5B relate to an embodiment where alternating current (AC) voltage is used. Hereby, FIGS. 4B and 5A relate to a first possibility of reducing the voltage applied to the pump 3 when using AC current.

Figure 5A:
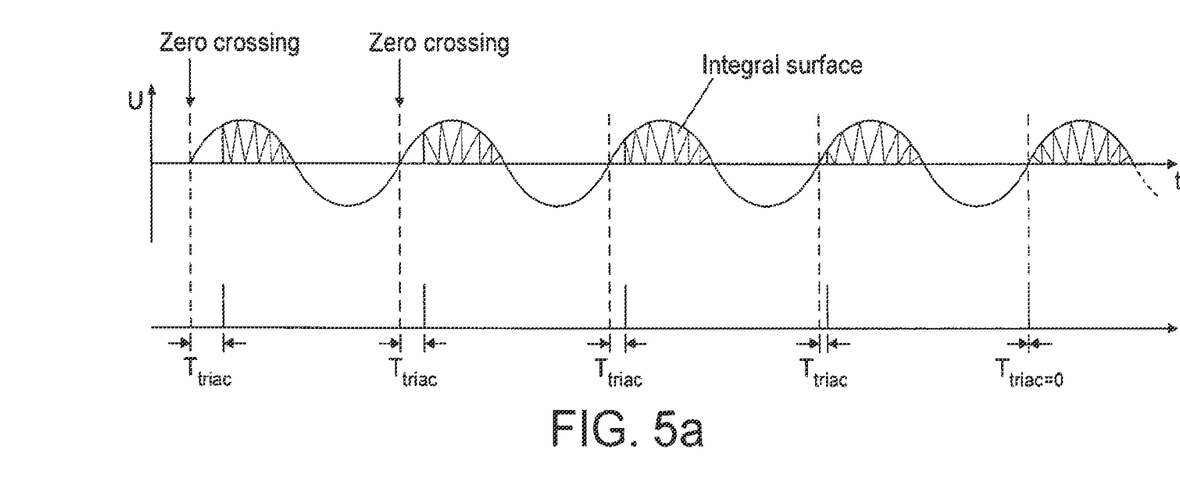
FIG. 5A is a diagram showing the development of the AC voltage over time according to the first possibility as explained in FIG. 4B.
Figure 5B:
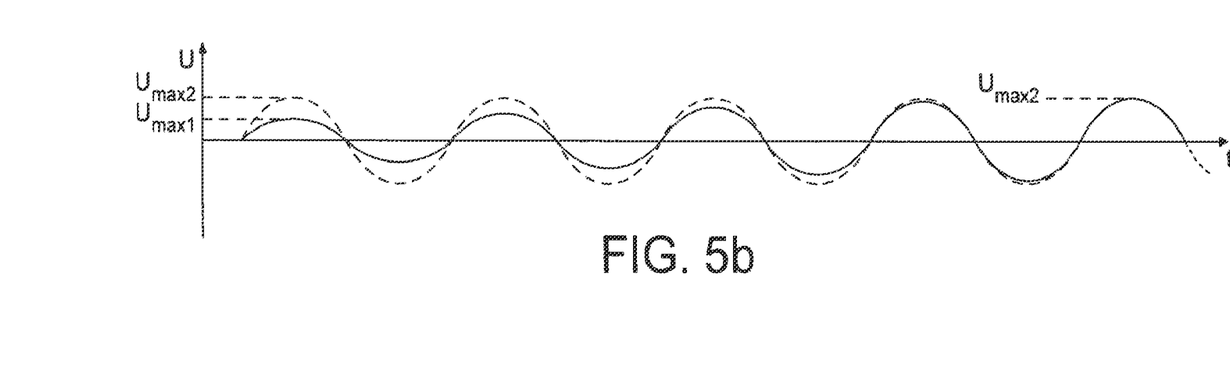
FIG. 5B is a diagram showing the development of the AC voltage over time according to the second possibility as explained in FIG. 4C.

In FIG. 5A a first diagram is shown showing the voltage delivered by the power source 17 over the time t. The voltage hereby corresponds to a sinus curve. In the first diagram the zero crossing point of the voltage is marked. In the normal operation mode the controller 14 operates the pump triac 16 in a way that the triac is triggered together with the zero crossing of the voltage so that the positive part of the voltage is applied to the pump and the negative part of the voltage is blocked by the triac 16. In order to decrease the voltage applied to the pump, the pump triac 16 is not triggered at the zero crossing of the voltage but triggered at a predefined time $T_{triac}$ after the zero crossing of the voltage. This is shown in the second diagram of FIG. 5A where the triggering moments of the pump triac are shown over the time. For increasing the crossing and the triggering of the pump, that is the time $T_{triac}$ is decreased with every voltage cycle, until the difference between the zero crossing and the triggering is zero. Alternatively, the difference between the zero crossing and the triggering can be maintained fixed for a predefined time range and then suddenly for the next voltage cycle set to zero. The advantage of slowly increasing the voltage is that thereby problems relating to electromagnetical compatibility can be avoided.

Figure 4B:
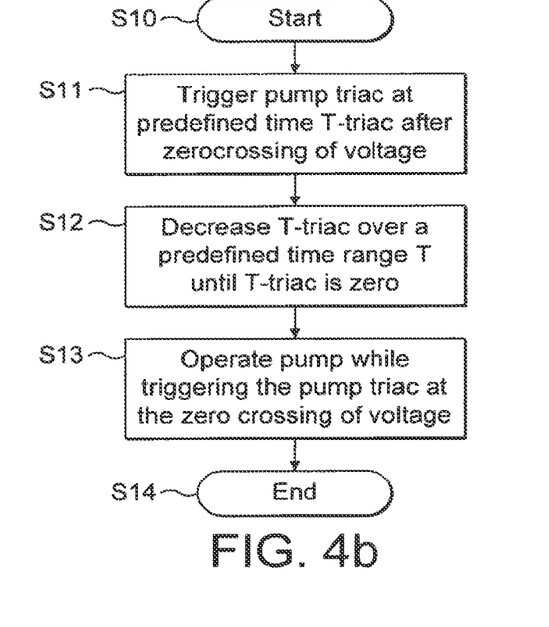
FIG. 4B is a flow chart showing the steps according to a first possibility when using AC voltage.

For a better understanding the steps as shown in FIG. 5A will be explained with reference to the flow chart shown in FIG. 4B. The process is started in step S10, e.g. with switching on the beverage production module 1 or with starting the preparation of a beverage. In the next step S11, the pump triac 16 is triggered at a predefined time $T_{triac}$ after zero crossing of the voltage. In the next step S12 which is repeated several times the difference between the zero crossing and the triggering is decreased over a predefined time range until $T_{triac}$ is zero. In the next step S13, the pump is then operated normally while triggering the pump triac 16 at the zero crossing of the voltage. The process ends in step S14, e.g. with switching off the beverage production module.

The advantage of this method is that no further hardware components are necessary for implementing the inventive method. Since during normal operation mode the negative part of the voltage sinus is already blocked and the pump triac 16 is already provided, the changed triggering time of the pump triac 16 is only a matter of software implementation and no special hardware is necessary.

A further possibility of reducing the AC voltage applied to the pump would be to use a reduced maximum voltage value. This will be explained in detail in the following. Generally, a voltage having a sinusoidal curve can be described with the following equation:

$$U(t) = U_{max} \sin(\omega t + \varphi_0)$$

$U_{max}$ designates the peak value of the voltage and $\varphi_0$ designates the zero phase angle of the voltage. The angular frequency $\omega$ can be derived from $$\omega = 2\pi f,$$

whereby f is the frequency.

According to the further idea of the present invention, the voltage applied to the pump can also be reduced by reducing the peak value $U_{max}$ of the voltage. This is shown for example in FIG. 5B. Here a sinusoidal voltage curve is shown over the time. Hereby the voltage starts with a peak value $U_{max1}$ and during several wave cycles is increased to a further peak value $U_{max2}$. Hereby, in the Figure the sinus voltage with the peak value $U_{max2}$ is shown with dashed lines. The actual voltage used for the operation of the pumped is shown as drawn through line. There from it can be seen that the actual used decreased voltage converges the normal operation voltage having the peak value $U_{max2}$.

Figure 4C:
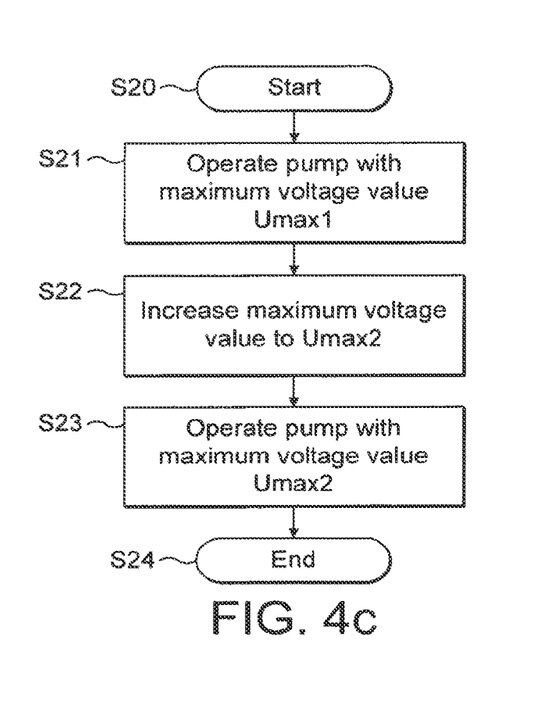
FIG. 4C is a flow chart showing the steps according to a second possibility when using AC voltage.

The steps of this process are also shown in the flow chart of FIG. 4C. Hereby, in accordance with FIGS. 4A and 4B, the process starts in step S20. In the next step S21 the pump 3 is operated with a peak value of the voltage $U_{max1}$. In the next step S22 which is repeated several times the voltage $U_{max1}$ is increased to the maximum voltage value of $U_{max2}$. In the further step S23 the pump 3 is then operated with the peak value of the voltage $U_{max2}$ and the process in step S24 ends for example with switching off the beverage production module.

As previously explained, the voltage can also be suddenly increased or can be increased linearly, exponentially, logarithmically or in any other way. The advantage of slowly increasing the voltage is that compatibility problems between different components can be avoided.

Advantageously, the pump 3 is an inductive component, e.g. a solenoid pump. In case that a pump is an inductive load then of importance is not the maximum applied voltage $U_{max}$ but more the integral of the applied voltage since the current is delayed after the voltage curve. As shown in FIG. 5A with triggering the triac after a predefined time after the zero crossing, the integral of the applied voltage can be changed. In case of an inductive load pump no further filters or components are required and electromagnetic compatibility problems can be avoided.

Alternatively, also other types of pumps can be used, in which case an additional filter could be provided in order to avoid compatibility problems.

Figure 6:
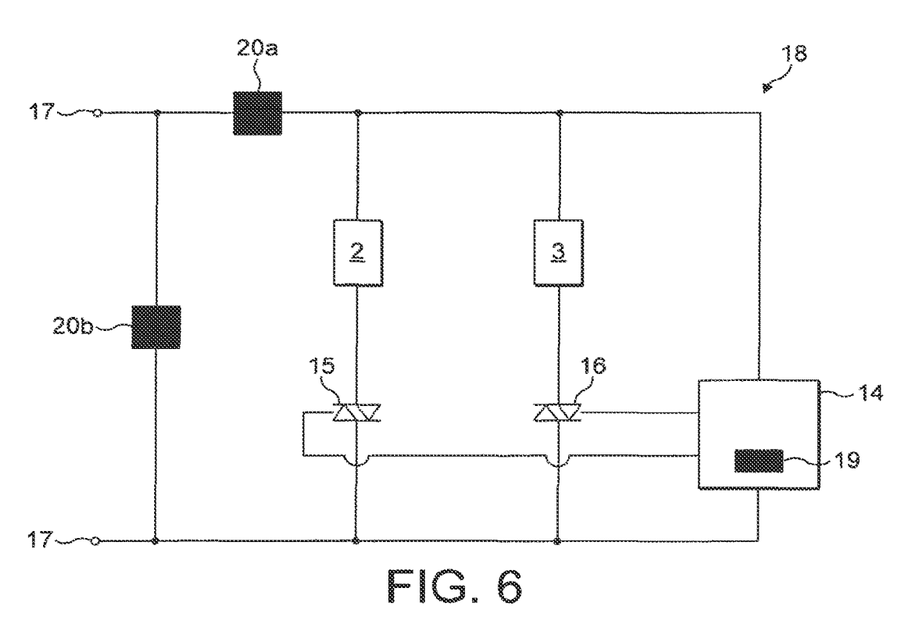
FIG. 6 shows the pump circuit when using AC voltage.

FIG. 6 is an exemplary embodiment of an electric circuit for the pump. In the electric circuit 18 a power source 17 is provided to which the pump 3, the heating unit 2, the heater triac 15 and the pump triac 16 are connected. In the circuit further the controller 14 is provided comprising a micro controlling unit 19. The controller triggers the triacs 15, 16 of the pump 3 and the heating unit 2 in order to control the applied voltage. In case that the pump 3 is not an inductive load additional filters 20a, 20b can be provided.

Figure 7A:
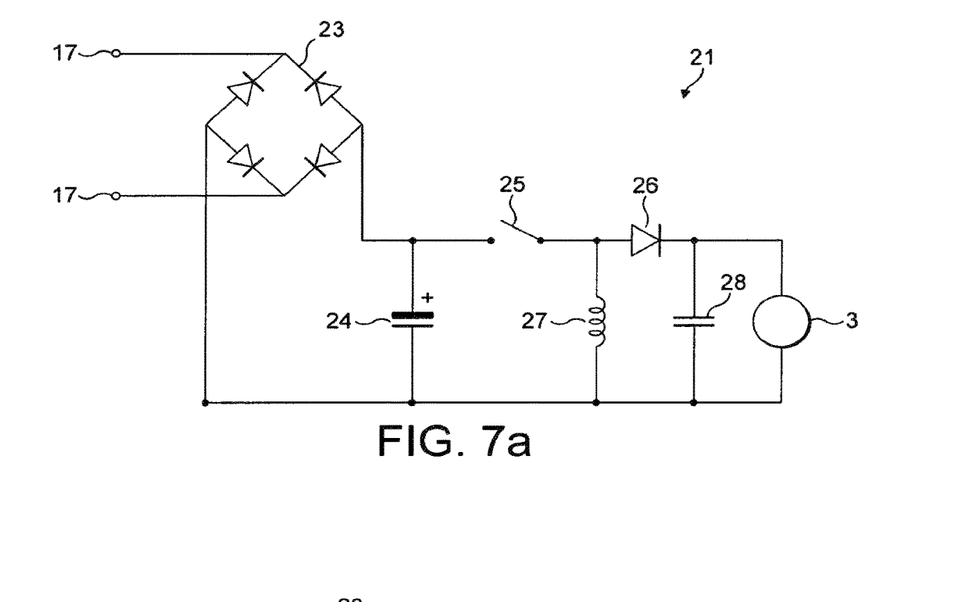
FIGS. 7A and 7B show different possibilities of a pump circuit when using DC voltage.
Figure 7B:
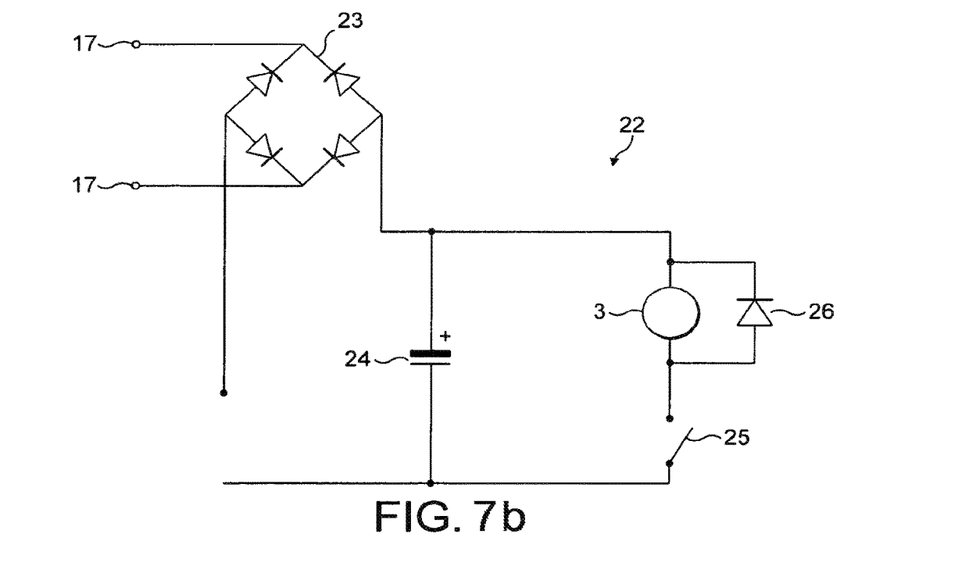

In an alternative embodiment instead of alternating current (AC) voltage also direct current (DC) voltage can be used. Two exemplary circuits are shown in FIGS. 7A and 7B. Hereby, after the power source 17 a rectifier 23 is provided for rectifying the alternating current voltage from the power source 17.

In FIG. 7A hereby a circuit using the rectifier 23 and a buck converter 21 is shown. In the circuit a polarized condensator 24, a switch 25, a diode 26, a coil 27 and a condensator 28 is provided for controlling the voltage applied to the pump 3.

In the example shown in FIG. 7B, the rectifier 23 and a motor chopper 22 is provided for controlling the pump 3.

The electric circuit includes a polarized condensator 24, a switch 25 and a diode 26.

When operating the pump 3 at a reduced voltage, the chosen voltage has to satisfy several needs. On one hand, the voltage has to be high enough to ensure a proper operation of the pump 3. On the other hand, the voltage has to be small enough in order to achieve the desired functions, e.g. a noise reduction or a reduced flow per time of the liquid. In case that the normal operation voltage of the pump is approximately 230V, a good compromise is a reduced voltage of 170V. This would correspond to an integral value of 73%.

REFERENCE SIGNS (1) Beverage production module
(2) Heating unit
(3) Pump (4) Activator
(5) Tank
(6) Button
(7) Casing
(8) Drip tray
(9) Cup support
(10) Catchment tank
(11) Graphical interface
(12) Capsule insertion slot
(13) Extraction chamber
(14) Controller
(15) Heater triac
(16) Pump triac
(17) Power source
(18) DC electric circuit
(19) Micro controlling unit
(20) Filter
(21) Buck converter
(22) Motor chopper
(23) Rectifier
(24) Polarized condensator
(25) Switch
(26) Diode
(27) Coil
(28) Condensator The invention is claimed as follows:

1. A beverage production module comprising:
a pump for delivering a fluid from a tank to an extraction chamber;
a power source for applying a voltage to the pump; and
a controller for operating the pump and for controlling the voltage applied from the power source to the pump, the controller is configured to operate the pump after a start at a first reduced voltage level; after a first predefined time, to operate the pump at a normal operation voltage; and, during the operation of the pump, to operate the pump for a second predefined time at a second reduced voltage level, wherein the controller is configured to maintain the voltage at the first reduced voltage level for the first predefined time.

2. The beverage production module of claim 1, wherein at least one of the first and second reduced voltage levels is a constant voltage.

3. The beverage production module of claim 1, wherein at least one of the first and second reduced voltage levels is a decreasing or increasing voltage.

4. The beverage production module of claim 1, wherein the power source provides a direct current DC voltage to the pump.

5. The beverage production module of claim 4, wherein the pump comprises a circuit comprising a Buck-converter.

6. The beverage production module of claim 4, wherein the pump comprises a circuit comprising a motor chopper.

7. The beverage production module of claim 1, wherein the power source provides an alternating current AC voltage to the pump.

8. The beverage production module of claim 7, wherein the controller is configured to operate the pump at the first and second reduced voltage levels by decreasing an integral of the applied voltage.

9. The beverage production module of claim 7, wherein the controller is configured to operate the pump at the first and second reduced voltage levels by decreasing a maximum applied voltage.

10. The beverage production module of claim 1, wherein the pump is an inductive load.

11. The beverage production module of claim 1, wherein the controller is configured to operate the pump at the first reduced voltage level for less than 10 s.

12. The beverage production module of claim 1, wherein the controller is configured to increase the voltage from the first reduced voltage level to the normal operation voltage using a voltage increase that is selected from the group consisting of a linear increase, an exponential increase, and a logarithmic increase.

* * * * *